United States Patent [19]

Murdock

[11] 3,906,354

[45] Sept. 16, 1975

[54] STANDARD CONDUCTIVITY CELL FOR MEASUREMENT OF SEA WATER SALINITY AND TEMPERATURE

[75] Inventor: Lawrence C. Murdock, Bellevue, Wash.

[73] Assignee: Westinghouse Electric Corporation, Pittsburgh, Pa.

[22] Filed: Oct. 9, 1973

[21] Appl. No.: 404,564

[52] U.S. Cl. ......... 324/30 B; 204/195 F; 73/362 AR
[51] Int. Cl. ............................................ G01n 27/42
[58] Field of Search...... 324/30 R, 30 B; 204/195 F; 204/272; 338/27, 30, 222

[56] References Cited
UNITED STATES PATENTS

| | | | |
|---|---|---|---|
| 2,330,394 | 9/1943 | Stuart | 324/30 X |
| 2,733,201 | 1/1956 | Thompson | 324/30 X |
| 3,147,431 | 9/1964 | Bennet et al. | 324/30 X |
| 3,479,580 | 11/1969 | Hottel, Jr. | 324/30 X |
| 3,549,989 | 12/1970 | Brown | 324/30 |

*Primary Examiner*—Alfred E. Smith
*Assistant Examiner*—Rolf Hille
*Attorney, Agent, or Firm*—D. Schron

[57] ABSTRACT

A standard conductivity cell having concentric thin-walled alumina cylinders with a thin film or layer of standard seawater contained between them. Electrical contact is made to the standard seawater by end electrodes and a pressure compensation arrangement allows for the cell's use at great depths in the water. With a known relationship between conductivity and temperature, the cell also operates as a very rapid temperature sensor.

14 Claims, 11 Drawing Figures

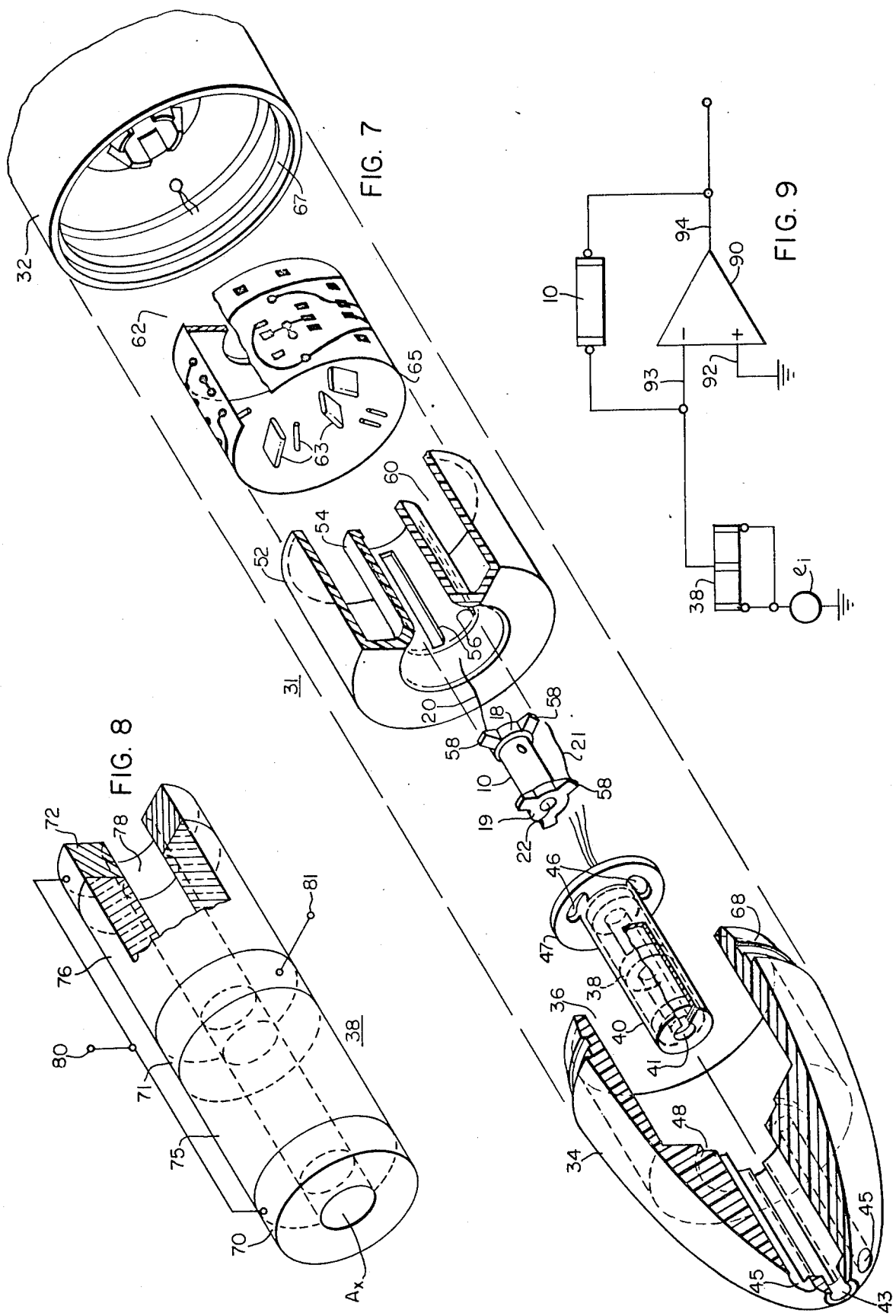

3,906,354

STANDARD CONDUCTIVITY CELL FOR MEASUREMENT OF SEA WATER SALINITY AND TEMPERATURE

BACKGROUND OF THE INVENTION

1. Field of the Invention

The invention in general relates to marine sensors and particularly to a standard conductivity cell.

2. Description of the Prior Art

Both military and scientific vessels at sea routinely make measurements of the temperature distribution in the water column beneath the vessel using an instrument called a bathythermograph. The data from these measurements is used to determine the profile of the thermocline, that is, the boundary between the upper mixed water layer and the lower colder water. A knowledge of this thermocline profile adds to the knowledge of ocean circulation, is useful is fishery operations and can be used in the prediction of sonar propagation.

It is often impractical to stop or slow down the vessel to take the measurements due to the tactical situation in a military mission or the economics of ship operation. In order to overcome this limitation a probe has been developed which can be launched over a side of the vessel in motion and which contains a spool or wire which is paid out at a predetermined constant rate. A second spool of wire on board the vessel is paid out as the vessel moves. Such an arrangement is described in U.S. Pat. No. 3,221,556.

Although predictions can be made from the thermocline profile, a much more accurate assessment of sonar propagation, ocean circulation and fishery migration can be obtained with a knowledge of the water salinity.

Basically salinity is a measure of the salt content of the water, typically seawater, and is a complex function of the temperature, conductivity and pressure of the seawater sample. Salinity can be determined by adding a conductivity cell to the probe and measuring the independent variables of temperature and conductivity and combining them with an indication of pressure, by means of an analog or digital computer. In order to achieve a salinity accuracy of 0.1 parts per thousand it is necessary to measure temperature to 0.05°C and conductivity to 0.05 millimhos, which requires a measuring system accurate to 0.1%. It would be desirable to have an instrument operable in the rigors of an at sea environment for long periods of time which would achieve the desired accuracy for salinity with the use of components having a less stringent accuracy requirement.

In addition, conductivity measurements have inherently nearly instantaneous response whereas temperature measurements inherently have a lag associated with their basis sensing device such as a thermistor. Accordingly the method of utilizing the temperature and conductivity readings to compute salinity cannot be utilized with accuracy in waters having high thermal gradients.

To this end, there has been proposed an instrument which utilizes two conductivity cells, one conductivity cell being adapted for measuring the conductivity of the water environment acting on the cell, and a second cell which is a standard cell for measuring the conductivity of a standard sample of water of known salinity. The ratio of the conductivity measurements of the two cells is, by international agreement, an indication of salinity. An output signal is obtained which is proportional to the conductivity ratio and this output signal is conveyed to a remote location such as by a wire link communication.

The key to accomplishing the conductivity ratio measurement is the ability to design and fabricate a standard cell filled with seawater of known salinity having a very fast thermal time constant and which can withstand the rigors of an at sea environment while maintaining high mechanical and chemical stability over a specified temperature range and storage period.

SUMMARY OF THE INVENTION

The present invention accomplishes the above by the provision of first and second electrically insulative members having spaced apart surface portions. In a preferred construction, this takes the form of first and second thin wall concentric cylinders. A standard sample of electrically conducting liquid of a known predetermined parameter is contained between the two cylinders and for use as a standard conductivity cell for determining water salinity, the standard sample would be standard seawater of a known salinity. In order to make electrical contact with the standard seawater, there is provided first and second electrodes which are supported by the cylinders and which are in electrical contact with the standard sample.

The cylinders are of a size to permit rapid heat transfer to the standard sample, while still maintaining high mechanical strength. For use at depth in the water pressure compensating means are provided so that the conductivity measurement of the standard sample is made at the ambient water pressure.

With a known relationship between conductivity and temperature, a reading of the conductivity of the standard cell gives an indication of temperature. Thus an extremely rapid thermistor or temperature sensor is provided.

BRIEF DESCRIPTION OF THE DRAWINGS

FIG. 7 is an exploded view with portions broken away of the nose section of the probe of FIG. 6;

FIG. 8 is a view, with a portion broken away, of a conductivity cell utilized in the probe of FIG. 6;

FIG. 9 is an electric circuit utilizing the conductivity cells of FIGS. 1 and 8;

DESCRIPTION OF THE PREFERRED EMBODIMENT

Figure 1:
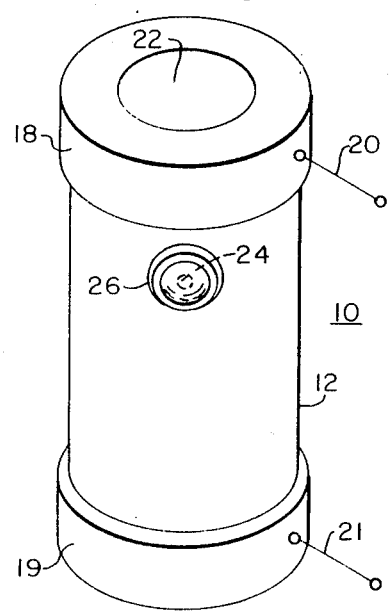
FIG. 1 is a perspective view of a preferred embodiment of the present invention.

A standard cell according to the teachings of the present invention includes first and second electrically insulative members having spaced apart surface portions which contain a thin layer of standard seawater. Such a standard cell is illustrated in one form in FIGS. 1, 2 and 3 to which reference is now made. The first and second members of the cell 10 are cylinders 12 and 13, cylinder 12 defining an outside wall and cylinder 13 defining an inside wall. Between the cylinders there is contained a standard sample of seawater 15, of a known salinity, for example, 35 parts per thousand.

In order to contain the thin film of seawater 15 and to make electrical contact therewith, there is provided first and second electrodes 18 and 19 each being of an annular shape to allow for ambient medium contact with the inside cylinder 13. The electrodes 18 and 19 may be formed of carbon, and may be secured to the cylinders by non-contaminating epoxy cement. Depending upon the circuit in which the cell is used, suitable electrical leads 20 and 21 may be electrically connected thereto and the electrodes may be provided with a suitable electrically insulative coating to prevent signal paths through the ambient medium should it be an electrically conducting one such as seawater.

In view of the fact that the cell may have to be stored for long periods of time, prior to its use, the construction and choice of materials should be such as to maintain a high chemical stability in that the standard water and the materials of construction must not interact to change the electrical conductivity of the standard water.

In use, the conductivity of the standard seawater sample is measured and this value changes with temperature. Accordingly, the materials of construction must be such as to result in a very short time constant device, that is, the standard sample contained between the cylinders 12 and 13 must be brought into equilibrium with the ambient medium temperature as rapidly as practical. A preferred, but not the only candidate for the cylindrical walls 12 and 13, is aluminum oxide, commonly known as alumina. Another possible choice is beryllium oxide, however, the resulting time constant is only slightly faster but the cost of the beryllium oxide is considerably more than alumina.

By way of example, and not by limitation, the typical cell may have a standard seawater sample thickness of several thousandths of an inch, e.g. 0.005 inches (0.0127 centimeters) with the water sample being of a length $L_S$ of 0.600 inches (1.524 centimeters). Each of the cylinders 12 and 13 would have thicknesses in the order of 0.015 inches (0.0381 centimeters) with the inside diameter of the inner cylinder 13 being 0.18 inches (0.457)

Figure 3:
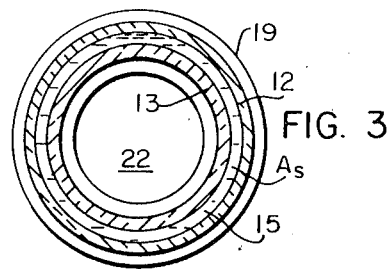
FIG. 3 is a view along the line III—III of FIG. 2.

The cross-sectional area $A_S$ of the standard water 15 is illustrated in FIG. 3 and it is to be noted that the area $A_S$ would not change even if the cylinders 12 and 13 were fabricated in a manner that they were touching one another so as not to be concentric, as illustrated.

Figure 2:
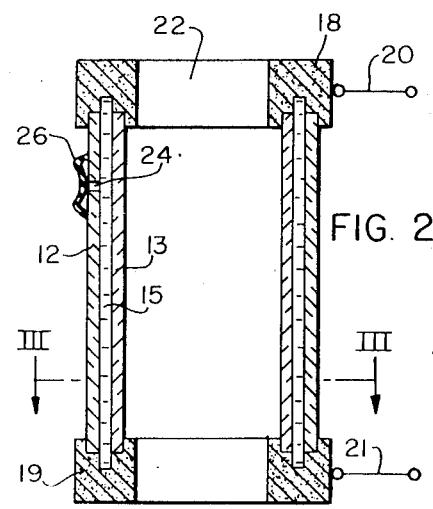
FIG. 2 is an axial cross sectional view of the cell of FIG. 1.

The AC resistance $R_S$ measured at the electrodes 18 and 19 is:

$$R_S = \frac{1}{\sigma_S} \times \frac{L_S}{A_S} \quad \text{Eq. (1)}$$

Where $L_S$ is the length of the standard seawater illustrated in FIG. 2, $A_S$ is the cross sectional area illustrated in FIG. 3, and $\sigma_S$ is the conductivity of the standard seawater.

The cell has a cell constant $K_S$ associated therewith and it is defined by the term $$\frac{L_S}{A_S}$$

so that $$R_S = \frac{K_S}{\sigma_S} \quad \text{(Eq. 2)}$$

The measurements of the cell's conductivity are made at the pressure of the ambient medium and accordingly means are provided to pressure compensate the cell so that the standard seawater sample 15 is at substantially the same pressure as the medium surrounding the cell. To this end, there is provided a small port 24 in the outer cylinder 12, and this port 24 may in addition be conveniently utilized as the fill hole by which the standard seawater is introduced between the cylinders 12 and 13. After suitable treatment of the surface of the cylinder 12 in the vicinity of the port 24, a film such as teflon film 26 may be bonded in place, the film 26 being in the form of a bellows or diaphragm to provide flexibility. With the provision of the flexible seal therefore, outside pressures are communicated to the standard seawater 15 and in addition, will allow the necessary volume increases to take place under freezing conditions.

Figure 4:
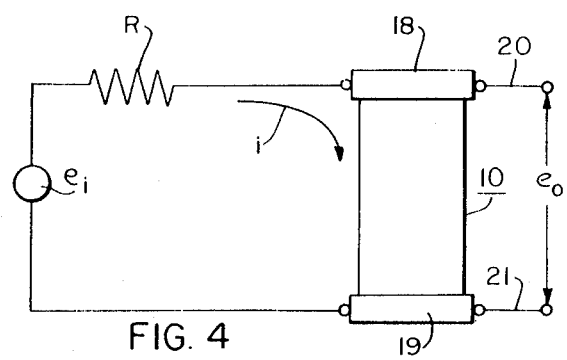
FIG. 4 is an electrical circuit illustrating the use of the cell as a temperature sensor.

In view of the fact that the thin film of seawater 15 is very rapidly brought into equilibrium with the temperature of the surrounding ambient medium, the cell may be utilized as a fast response temperature indicator. A circuit for performing this function is illustrated in FIG. 4. The cell 10 is electrically connected to an AC source $e_i$ through a resistance R. The arrangement provides a current $i$ through the cell 10 and the output voltage $e_o$, the voltage across the cell is an indication of the current through the cell times the resistance of the cell. From circuit theory, and equation (2), it may be shown that:

$$\sigma = \frac{K(e_i - e_o)}{e_o R} \quad \text{Eq. (3)}$$

Eq. (3)

Since all of the terms in the right-hand side of equation (3) are known or measurable the conductivity may be determined.

Figure 5:
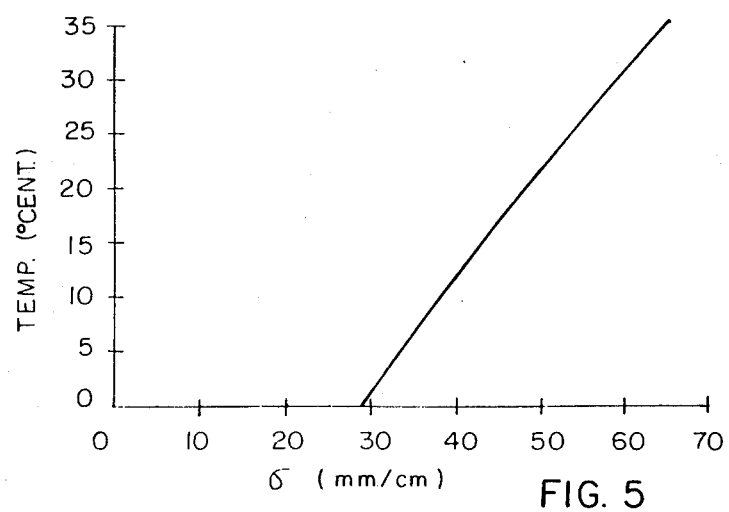
FIG. 5 is a curve illustrating the relationship between temperature and conductivity.

FIG. 5 illustrates a curve of conductivity variation with temperature for a typical cell as illustrated and from such curve, the temperature of the ambient medium acting on the cell may be determined from a knowledge of the conductivity. This may be accomplished by reference to such curve or may be done automatically by a computer into which the curve of FIG. 5 would be programmed.

It is to be noted that for the temperature measurement, an AC source is utilized. Use of a DC source will cause polarization within the cell whereby hydrogen would be produced which would impair proper operation of the cell.

Figure 6:
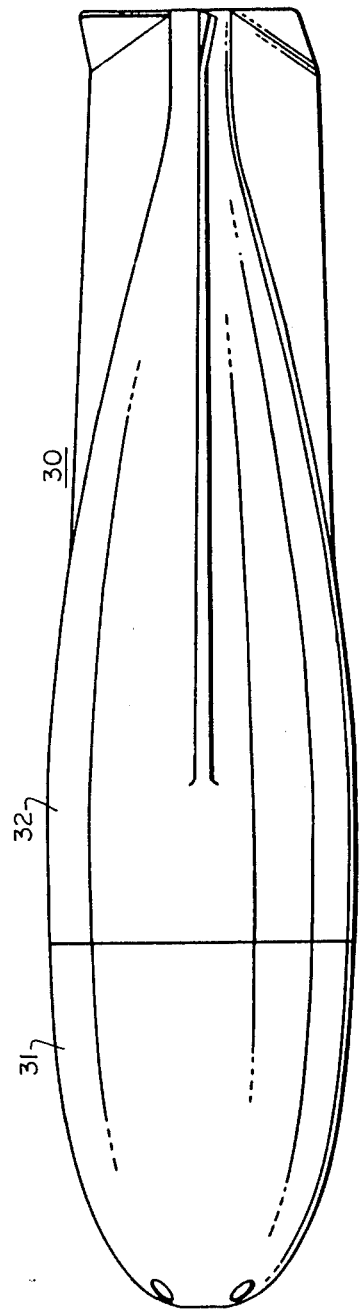
FIG. 6 illustrates an oceanographic probe in which the present invention finds utility.

Another important use for the cell is in the determination of salinity as discussed in the prior art, and a marine instrument incorporating this cell for such use is illustrated in FIG. 6.

The marine instrument illustrated in FIG. 6 is in a form of an oceanographic probe 30 having a nose section 31 and a tail section 32 defining a hydrodynamic body which is dropped through the water column. Due to the hydrodynamic shape and ballast or weighting considerations, the probe will drop through the water column, nose section first, at a constant drop rate.

The exploded view, with portions broken away, of FIG. 7 illustrates the nose section 31 in more detail. The nose section includes a body portion 34 having a large cavity 36 for the placement of certain components. Ballast weights may be molded into the body portion 34, or the body portion 34 itself may be considered as the ballast and may be molded from various materials such as plastics or various metals. A first cell 38 is provided for obtaining the conductivity of the water environment acting on the cell and in this respect it is considered as an in situ conductivity cell. The in situ cell 38, which will be described with respect to FIG. 8, is placed in a container or envelope 40 having a hole 41 at the end thereof and the unit is placed into a primary or central flow path 43 whereby as the probe drops through the water column, the water whose conductivity is to be measured passed through the central flow path and in so doing passes through the hole 41 in the container 40 and through the central portion of the in situ cell 38.

In addition to the first cell, there is included a second conductivity cell in the form of the standard cell 10 which provides an indication of the conductivity of the standard sample of seawater contained therein. The standard cell 10 is in close proximity to the in situ cell 38 so that both conductivity measurements are made at substantially the same water temperature.

The axial passage 22 of the standard cell 10 lines up with the axial passage of the in situ cell 38 and in order to increase the water flow through and around the standard cell 10 there is provided a plurality of auxiliary flow paths 45 whereby water flows past the in situ cell 8 but does not contact it due to the container 40 and then passes through a plurality of apertures 46 in the disc-like end section 47 of the container and which end section 47 fits into a mating recess 48 when assembled in the body portion.

Means are provided for supporting the standard cell 10, and preferably for supporting it in line with the primary flow path 43. One way of accomplishing this is by the provision of a housing 52 having a central cylindrical portion 54 with a plurality of longitudinal slots 56 for receiving tabs or projections 58 built into the electrodes 18 and 19 of the standard cell 10 in order to hold it in position. When so positioned, water entering the nose section through the primary and auxiliary flow paths passes axially through and around the standard cell 10.

The support for the standard cell is conveniently shown as being incorporated into a removable housing, however, it is possible for the support to be molded as a part of the body portion 34.

Around the central cylindrical portion 54 there is defined an annular cavity 60 for reception of the electronics section 62 which has a plurality of electric circuit components 63 mounted on a printed circuit board 65 of a size and shape to conveniently slip into the annular cavity 60. Many variations for this configuration exists, including the pre-potting of the electronic components into cylindrical form for insertion around the central cylindrical portion 54 or the insertion of the electronic components and the subsequent potting thereof.

A portion of the tail section 32 is illustrated and the interior thereof includes a plurality of lands and grooves 67 for complementary engagement with lands and grooves 68 of the nose section 34 to form a press fit locking arrangement.

Although not shown, the tail section 32 includes a spool or wire arrangement which pays out through an opening in the end of the tail section 32, such arrangements being well known to those skilled in the art and described for example in U.S. Pat. No. 3,221,556.

FIG. 8 is a more detailed view, with a portion broken away, of the in situ cell 38. The in situ cell 38, includes a plurality of electrodes 70, 71, and 72 separated by insulator spacer members 75 and 76. In situ seawater flows through the hollow middle 78 of the cell and the cell is continually flushed as the probe is dropped, thereby being fresh fluid at the new depth into contact with the electrodes. In order to prevent any shunt conductance path between electrodes as in a two electrode cell which would result in a measurement error, the in situ cell has three electrodes with the two end electrodes 70 and 72 electrically connected together and connected to terminal 80, while the middle electrode 71 is connected to terminal 81.

The resistance $R_x$ between the terminals 80 and 81 is:
$$R_x = \frac{1}{\sigma_x} \times \frac{L_x}{A_x} \qquad \text{Eq. (4)}$$

where $L_x$ is the length between the middle of the electrodes 70 and 71, (or 71 and 72, the distances being equal) $A_x$ is the cross-sectional area of the hollow middle in which the water flows, and $\sigma_x$ is the conductivity of the water in the cell.

Since $L_x$ and $A_x$ are fixed, their ratio is fixed and Equation (4) reduces to $$R_x = \frac{K_x}{\sigma_x} \qquad \text{Eq. (5)}$$

where $K_x$ is the cell constant equal to $$\frac{L_x}{A_x}.$$

During operation, water continually fills the interior of the in situ cell 38 and it is desired to eliminate or minimize any water contact with the outside of the cell which would cause undesirable variations. For this purpose there is provided the container 40 illustrated in FIG. 7. As an alternative, electrodes such as 70, 71, and 72 may be molded directly into the body portion of the nose section, if it is of an insulating material, with an axial passage through the electrode for water.

Due to the construction of the standard cell 10 it has an extremely rapid time constant to quickly bring the thin film of water 15 to the temperature of the surrounding ambient water so that a conductivity ratio can be obtained from conductivities measured at substantially the same temperature as required by international agreement. It is to be noted that the salinity of the thin film water sample remains constant, however, its conductivity is subject to change with different temperatures and may vary for example, within a certain temperature range, of from 0.0275 mhos/cm to 0.063 mhos/cm. Due to the fact that both cells are at substantially the same temperature however their ratio would vary from approximately 0.8710 at a salinity of 30 parts per thousand to 1.1261 at a salinity of 40 parts per thousand.

The two cells are connected in an electric circuit operable to provide an output signal proportional to the ratio of the conductivity of the water environment acting on the in situ cell with respect to the conductivity of the standard cell. Such a circuit is illustrated in FIG. 9.

A high gain operational amplifier 90 has a non-inverting, or a positive input 92, an inverting, or negative input 93, and an output 94. The in situ cell 38 is connected between an AC source $e_i$ and the negative input 93 and the standard cell 10 is connected in a feedback relationship between the output 94 and the negative input 93. The positive input 92 is connected to a reference potential such as ground.

The ratio of the ouput voltage $e_o$ to the input $e_i$ is given by:

$$\frac{e_o}{e_i} = -\frac{R_S}{R_X} \cdot \frac{R}{(1-A)} \qquad \text{Eq. (6)}$$

where $R_S$ is the resistance of the standard cell 10, $R_X$ is the resistance of the in situ cell 38, and $A$ is gain of the amplifier 90. Since the amplifier 90 is a high gain amplifier Equation (6) reduces to:

$$\frac{e_o}{e_i} = -\frac{R_S}{R_X} \qquad \text{Eq. (7)}$$

substituting from Equations (1) and (4):

$$\frac{e_o}{e_i} = -\frac{\frac{1}{\sigma_S}\frac{L_S}{A_S}}{\frac{1}{\sigma_X}\frac{L_X}{A_X}} \qquad \text{Eq. (8)}$$

substituting the cell constants:

$$\frac{e_o}{e_i} = -\frac{\sigma_X}{\sigma_S}\frac{K_S}{K_X} \qquad \text{Eq. (9)}$$

Since the cell constants do not change, $$\frac{K_S}{K_X}$$

may be replaced by another constant $K$ so that:

$$e_o = -e_i \frac{K\sigma_X}{\sigma_S} \qquad \text{Eq. (10)}$$

Equation (10) shows that the output signal from the circuit of FIG. 9 is proportional to the ratio of the conductivities and is, by definition, therefore proportional to the salinity of the water sample being measured due to the fact that the arrangement of the components of the probe are such that the measurements are being made at substantially the same temperature. The standard cell 10 is shown in the feedback path between the output and the input of the amplifier 90, however, the in situ cell and standard cell positions can be reversed for which case the output signal would be proportional to the conductivity ratio $$\frac{\sigma_S}{\sigma_X}.$$

The remote signal from amplifier 90 may then be removed to a remote location such as to the surface vessel via the contained wire, in order to perform the necessary calculations for salinity determination. If there is a requirement to known one or more of the individual conductivity measurements, for example, to obtain a temperature indication by the conductivity measurement of the standard cell 10, the individual measurements may be separately conveyed to the remote location.

By way of example, let it be assumed that a cell of the previously given dimensions is utilized in the probe of FIG. 6 which drops through the water at a rate of 7.6 meters per second. Using alumina as the cell wall construction, alumina has a thermal conductivity of $$232 \; \frac{\text{BTU-inches}}{\text{hour ft}^2 \, °F},$$

a specific heat of $$0.21 \; \frac{\text{BTU}}{\text{lb.}°F}$$

and a density of 0.144 lbs. per cubic inch. It may be shown that such cell would have a time constant in the order of hundredths of second. If the cell is at one temperature and is then subject to a new temperature, the time constant is that time it will take for the cell to attain 63.2% of the change to the second temperature.

Figure 10:
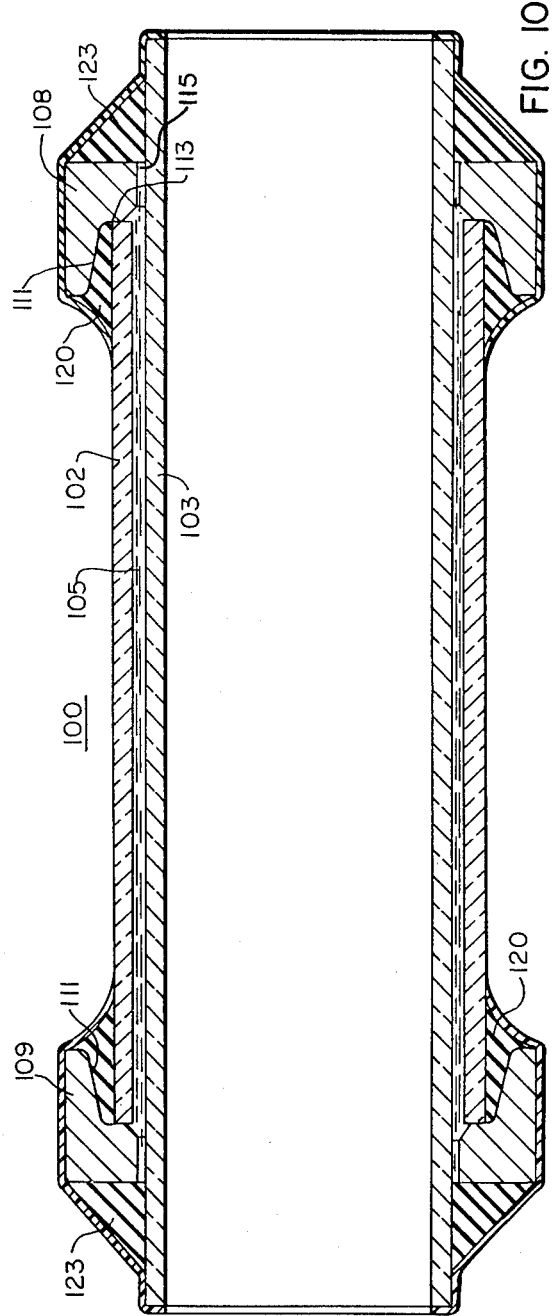
FIG. 10 illustrates in an axial cross-sectional view, another constructional arrangement of the cell.

An axial cross-sectional view of another embodiment also described, and claimed in commonly assigned copending application Ser. No. 404,576 filed concurrently herewith, is illustrated in FIG. 10. Whereas in the cell of FIG. 2, the cylinders 12 and 13 were of exactly the same length, the cell 100 in FIG. 10 includes cylinders 102 and 103 of different lengths to facilitate in the ease of manufacture and assembly. Contained between the outer cylinder 102 and the inner cylinder 103 is a standard sample of water 105 whose conductivity is to be measured. Electrical contact with the standard sample of water 105 is accomplished by the provision of end electrodes 108 and 109 both of which may be of identical construction. Examining electrode 108 as exemplary, it may be seen that the electrode includes a sloping inner surface 111 terminating at a ledge portion 113 and when in assembled condition, a notch portion 115 defines a small separation between the electrode and the inner cylinder 103.

In assembling the cell 100, a flexible seal hood material 120, such as a butyl rubber compound is placed on the outer periphery of the cylinder 102 at the edges thereof in a manner that the flexible seal bond fills the gap between the cylinder 102 and the sloping inner surface 111.

The inner cylinder 103 is then inserted through the central opening in both electrodes 108 and 109 and a flexible seal bond 123 is applied to only one end, in FIG. 10. With the cell in an upright position, the standard seawater 105 may be introduced under vacuum conditions into the space between cylinders 102 and 103 by insertion through the small separation formed between notch 115 and the inner cylinder 103. After filling, the flexible seal bond material 123 is applied to the upper end and thereafter a water vapor barrier sealing material such as a lacquer may be applied to the electrodes and flexible seal bond material. Not only does the arrangement of FIG. 10 eliminate the need for close tolerances in the length of the inner and outer cylinders, but the construction is such that less material is needed in the fabrication of the electrodes. The unit is sealed with relative ease, and the flexible sealed bond material is additionally operable to transmit the ambient medium pressure to the enclosed standard seawater 105.

As was the case with respect to the cell of FIG. 1, the cell of FIG. 10 has a very small thermal time constant in order to provide accurate data while passing through thermal gradients. The outer and inner cylinders 102 and 103 may be fabricated of alumina with the outer cylinder by way of example having a 0.250 inch (0.635 cm) outside diameter and being a length 0.600 inch (1.524 cm) with a wall thickness of 0.015 inch (0.038 cm). The inner cylinder 103 in comparison would have an outside diameter of 0.210 inch (0.5334 cm) with a length of 0.840 inch (2.134 cm) with the same wall thickness as cylinder 102. The electrodes 108 and 109 are preferably identical and may be of a 4 to 8% porous carbon construction having an outside diameter of 0.50 inch (1.27 cm) with a thickness of 0.10 inch (0.254 cm).

Sealing of the standard sample 105 is accomplished with a minimal amount of dissolved oxygen and the construction and materials are such as to insure against the loss of the standard sample 105 through the cell walls, electrodes and seals, over a period of years.

The cell can withstand storage temperature in the range from below freezing to as high as 75°C without undergoing structural damage and has the ability to withstand a thermal shock range from about 0°C to 65°C. Tests on the cell as illustrated in FIG. 10 have resulted in a temperature response time change as rapidly as 90 milliseconds for relative motion within a fluid.

Figure 11:
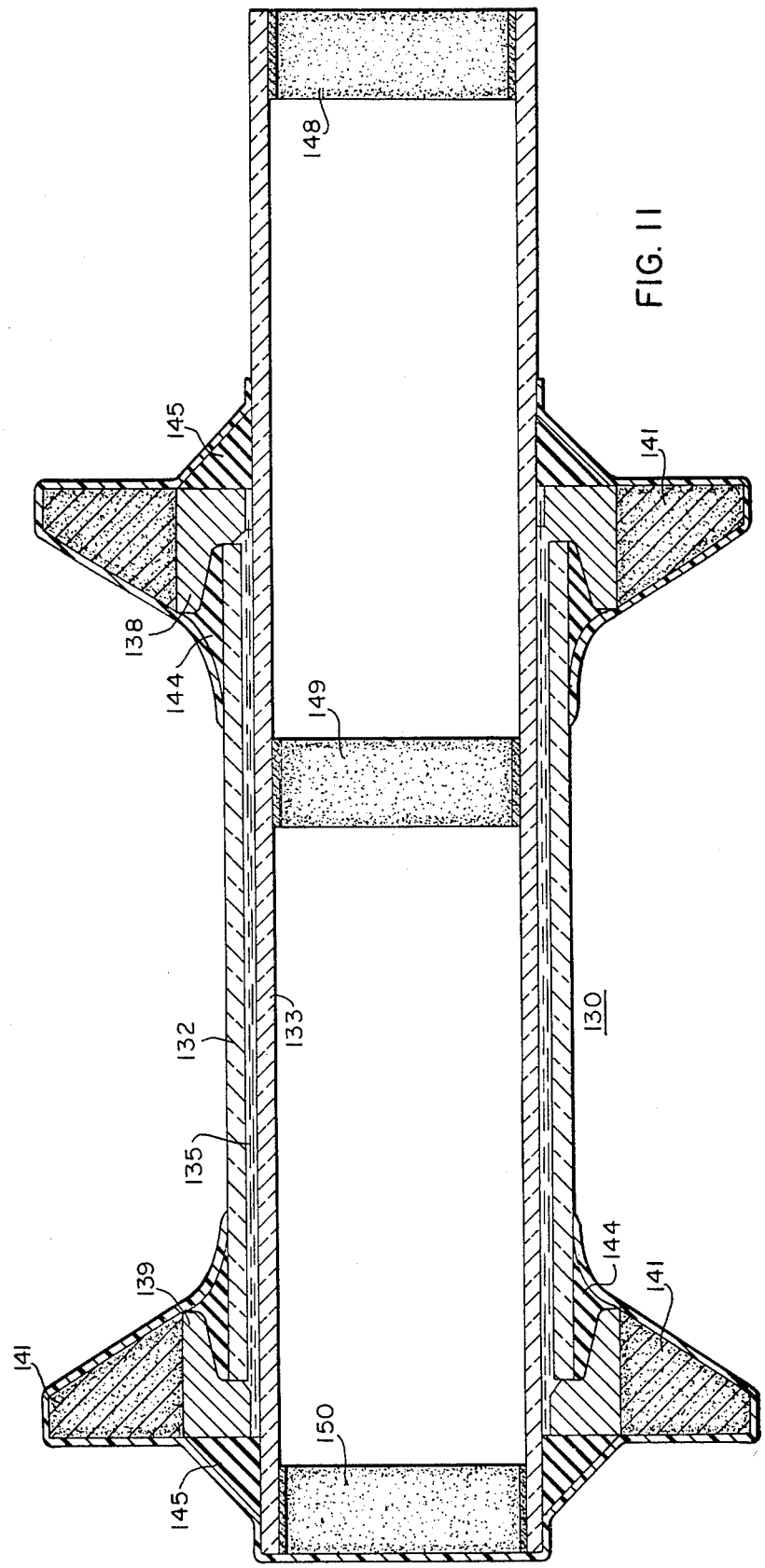
FIG. 11 illustrates an in situ standard cell arrangement.

FIG. 7 described an arrangement utilizing an in situ cell and a standard cell in a probe in order to obtain an indication of salinity. The cells were located in close proximity to one another so that the measurements could be made at substantially the same temperature. In FIG. 11, there is illustrated a sensor cell arrangement which provides for both the in situ and standard cell measurements of conductivity. The arrangement 130 is very similar to the standard cell 100 of FIG. 10 in that it includes first and second cylindrical members 132 and 133, one disposed within the other and defining a space therebetween for reception of the standard sample of water 135. The electrodes 138 and 139 make electrical contact with the standard sample of water 135, as before, and for mounting purposes such as in the arrangement of FIG. 7, there is provided a plurality of tabs or projections 141 integral with the electrodes 138 and 139. A flexible sealing bond 144 is disposed between the outer cylinder 132 and the electrodes, and flexible sealing bond 145 connects the electrodes with the inner cylinder 133.

A plurality of additional electrodes such as 148, 149 and 150 are disposed in spaced relationship on the inside surface of the inner cylinder 133 and may be applied by a carbon deposition technique. Suitable leads (not illustrated) would then be provided to all of the electrodes so that the electrical circuit arrangement for obtaining conductivity ratio may be obtained. The arrangement 130 therefore provides a standard cell utilizing a standard sample of water 135 with electrical contact being made thereto by electrodes 138 and 139, in addition to providing an in situ cell comprised of the inner cylinder 133 with its associated electrodes 148 to 150 with the two cells having a common wall provided by a portion of the cylinder 133. For the electrical measurements, it is preferable that the in situ cell portion of the arrangement have a relatively high resistance. To accomplish this, the inner cylinder 133 is made relatively long and by way of example, if the length of the outer cylinder 132 is 0.600 inches (1.524 centimeters) the length of the in situ cell, that is the length of the inner cylinder 133 may be 3 to 4 inches (7.62 to 10.16 centimeters.)

What is claimed is:

1. A standard cell comprising:
   A. first and second electrically insulative, relatively thin members having spaced apart surface portions;
   B. a thin film of a standard sample of electrically conducting liquid of a known predetermined parameter contained between said surface portions and having a thickness less than the thickness of at least one of said insulative members; and
   C. first and second electrodes supported by said insulative members and being in electrical contact with said standard sample.

2. A standard cell comprising:
   A. first and second electrically insulative cylindrical members, one disposed within the other and defining a relatively thin space therebetween;
   B. a thin film of a standard sample of electrically conducting liquid of a known predetermined parameter contained in said space and having a thickness less than the thickness of at least one of said insulative cylindrical members; and
   C. first and second electrodes in electrical contact with said standard sample; at opposite ends of at least one of said cylinders.

3. Apparatus according to claim 2 wherein;
   A. both said cylindrical members are of equal length.

4. Apparatus according to claim 2 wherein:
   A. said first and second cylindrical members are concentric.

5. Apparatus according to claim 2 wherein:
   A. said first and second electrodes are annular;
   B. said first and second cylindrical members being arranged relative to said electrodes that an ambient medium passes through the central openings in said annular electrodes and contacts the inside surface of the inner one of said cylindrical members.

6. Apparatus according to claim 2 wherein:
A. said first and second cylindrical members are made of alumina.

7. Apparatus according to claim 1 which includes:
A. means for transmitting the ambient pressure to said standard sample.

8. Apparatus according to claim 2 wherein:
A. one of said cylindrical members includes an aperture for the introduction of said standard sample into said space; and which includes
B. means for flexibly sealing said aperture to allow for expansion of said standard sample and the transmission of ambient pressure thereto.

9. Apparatus according to claim 5 which includes:
A. a plurality of projecting tabs on said first and second annular electrodes for mounting and maintaining said cell in a carrier.

10. Apparatus according to claim 1 wherein:
A. The average distance between said spaced apart surface portions is in the order of several thousandths of an inch.

11. Apparatus according to claim 1 wherein:
A. said standard sample is seawater of a known salinity.

12. Apparatus according to claim 5 which includes:
A. a plurality of additional electrodes in spaced relationship in on said inside surface of said inner cylindrical member.

13. Apparatus according to claim 12 wherein:
A. said electrodes are deposited on said inside surface.

14. Apparatus according to claim 12 wherein:
A. said inner cylindrical member is longer than the outer one and extends through and past said central opening in at least one of said annular electrodes;
B. two of said plurality of electrodes being deposited at respective ends of said inner cylindrical member.

* * * * *